United States Patent [19]

Baudot

[11] 4,123,190

[45] Oct. 31, 1978

[54] APPARATUS FOR PREPARING CORRUGATED SHEETS AUTOMATICALLY

[76] Inventor: Jean C. Baudot, Rue du Moulin de l'Arche, Saint-Fargeau, Yonne, France

[21] Appl. No.: 729,888

[22] Filed: Oct. 6, 1976

[30] Foreign Application Priority Data

Oct. 9, 1975 [FR] France ............................... 75 30927

[51] Int. Cl.2 ............................................... B23B 51/08

[52] U.S. Cl. ..................................... 408/25; 144/3 R; 144/35 R; 408/26

[58] Field of Search .................... 144/1 R, 3 R, 35 R, 144/326 R, 325, 309 R; 408/22, 25, 26, 30

[56] References Cited

U.S. PATENT DOCUMENTS

| | | | |
|---|---|---|---|
| 2,593,144 | 4/1952 | Gillespie | 408/25 |
| 3,339,601 | 9/1967 | Christman et al. | 144/3 R |
| 3,473,583 | 10/1969 | Pallagrosi et al. | 408/25 |
| 3,832,083 | 8/1974 | Dockery et al. | 144/35 |

*Primary Examiner*—Othell M. Simpson
*Assistant Examiner*—W. D. Bray
*Attorney, Agent, or Firm*—Michael Klotz

[57] ABSTRACT

Apparatus for preparing corrugated sheets is described which comprises a table for supporting one or more sheets, an assembly of cutting and perforating tools for cutting corners off the sheets and making holes in them, and means for moving the table and tool-supporting assembly towards and away from one another to effect the cutting and perforating of the sheets.

6 Claims, 8 Drawing Figures

APPARATUS FOR PREPARING CORRUGATED SHEETS AUTOMATICALLY

This invention relates to apparatus for preparing corrugated sheets automatically, particularly but not exclusively for cladding sheets made of an asbestos cement mixture, known in practice as corrugated asbestos sheets.

In use, such corrugated sheets are fixed to a timber framework by means of coach bolts or special types of attachments. These sheets have standardised sizes so it is necessary before putting them in place to perforate them at specified places, the apertures so made allowing the passage of the coach bolts or attachments. On the other hand, the feature of the weather-proofness of a roof clad with such sheets results partly from the assembly of the sheets one over another. The sheets must overlap and there are two types of overlapping: transverse overlapping which allows the sheets to be juxtaposed each by the side of the next, and longitudinal overlapping which permits the assembly of sheets one above another. It is understood that, in corners where four sheets meet, there exists an excess thickness which results in overhangs between the waves of the covering sheets and the piece of the timberwork serving for fixation or the purlin or again between the corrugations of the covering sheets and the corrugations of the covered sheets. These overhangs constitute starts for fracture with little effort exercised on the sheets.

The arrangement called "cut-corners" permits these overhangs to be avoided and ensures weather-proofness while permitting an appropriately adjusted longitudinal covering. Thanks to this method, not more than three thicknesses of sheets are superposed in the areas where the cladding sheets overlap. This arrangement is shown in FIGS. 7 and 8 of the accompanying drawings.

FIG. 7 shows an asbestos cement corrugated sheet 100 which should be pierced at 101 and of which the corners 102 should be cut off in order to obtain the mounting shown of FIG. 8. In FIG. 8 there is drawn in section the assembly of four corrugated sheets 100, 200, 300, 400. The cut corners 102 and 202 of sheets 100 and 200 come to be inserted between the sheets 300 and 400 and since the corners have been cut off, any excess thickness can be avoided.

At the present time, the corners have to be cut on site before the sheets are put into place and the operation of cutting off the corners is in practice actually carried out by hand with suitable template. The piercing of the holes and the cutting off of the corners constitute what must be done after the manufacture of the sheets which, as has been stated above, is carried out on site.

Unfortunately, these operations carried out by hand are long. One reckons in fact that of four persons occupied in covering a building, one of these is occupied full time in preparation operations. This substantially increases the cost of erection. On the other hand, although the corrugated sheets are resistant once put in place and suitably assembled, they are relatively fragile while they are not erected on a support. Even with the greatest care, a certain number of plates are destroyed or at least are rendered no longer suitable to ensure sealing covering, in the course of the preparation operations. Finally, the operations are carried out in the dry and the asbestos dusts can affect the health of the workers. The present invention has as its object remedying the disadvantages noted above and permitting the preparation of the sheets to be carried out in automatic fashion or at least semi-automatic fashion. It is known to shape sheets of asbestos cement during manufacture, e.g. as described in U.S. Patent Specification 3353256 but the present invention is concerned with post-manufacturing treatment.

According to the present invention there is provided apparatus for preparing corrugated sheets comprising a table capable of supporting at least one sheet, means for feeding corrugated sheets on to the table into a longitudinally defined position, perforation tools and cutting tools, means for displacing the table and the tools relative to one another and means for extracting prepared sheets from the table.

The operations of piercing and cutting off the corners can be simultaneous, which reduces quite substantially the time necessary for preparation. The operations of cutting off the corners and piercing fixing holes can be carried out on one or a plurality of sheets e.g. up to ten sheets. This number appears to be an optimum, taking into account the fact that in certain circumstances the sheets do not have the same thickness on the two sides and as a result, piling is not quite square. In these conditions, the dimensions of the cuts and the positions of the apertures are no longer correct.

Preferably the table carries at least two support elements for centreing the sheets, the upper surface of each support element having a shape complementary to that of the corrugations of the sheet, and at least two bearing members parallel to the support elements. In effect, one of the difficulties of the operation of preparation results in the fact that it is not possible to take the edges of the sheets as a reference base taking into account the variations of the dimensions which are produced during manufacture. By using such support elements, centreing is automatically effected in the lateral direction since the summit, for example of the second wave of the sheet, comes to rest on the support elements. The other side of the sheet comes to lie on a bearer member which can be shaped or flat and which, if shaped, can likewise cooperate in the centreing of the sheet on the table. This centreing is a very important feature since it permits the position of the apertures to be determined in repeatable fashion. Up till now, cutting off the corners and piercing which have been carried out by hand have never given very great regularity. Using the apparatus according to the invention, the sheets can have their corners cut off and be pierced rigorously in the same fashion, which considerably facilitates erection and alignment of the covering. Furthermore, the sheets are conveniently treated in the apparatus which permits substantial economies to be effected in the precentage of sheets broken during manual cutting off of the corners.

The invention is illustrated by way of example, in the description which follows of one particular embodiment of apparatus, shown in the accompanying drawings in which.

Figure 1:
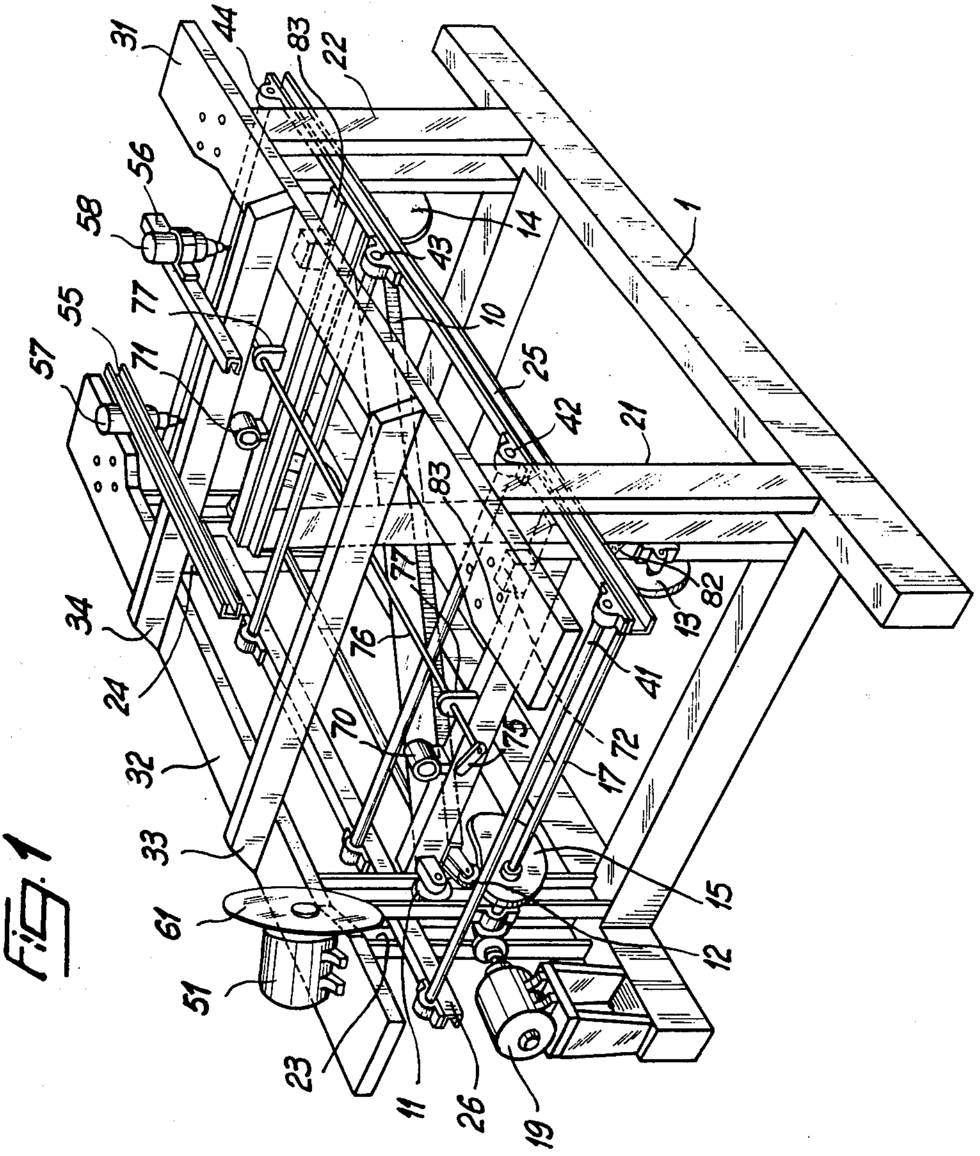
FIG. 1 is a diagrammatic perspective view of part of an apparatus according to the present invention.
Figure 2:
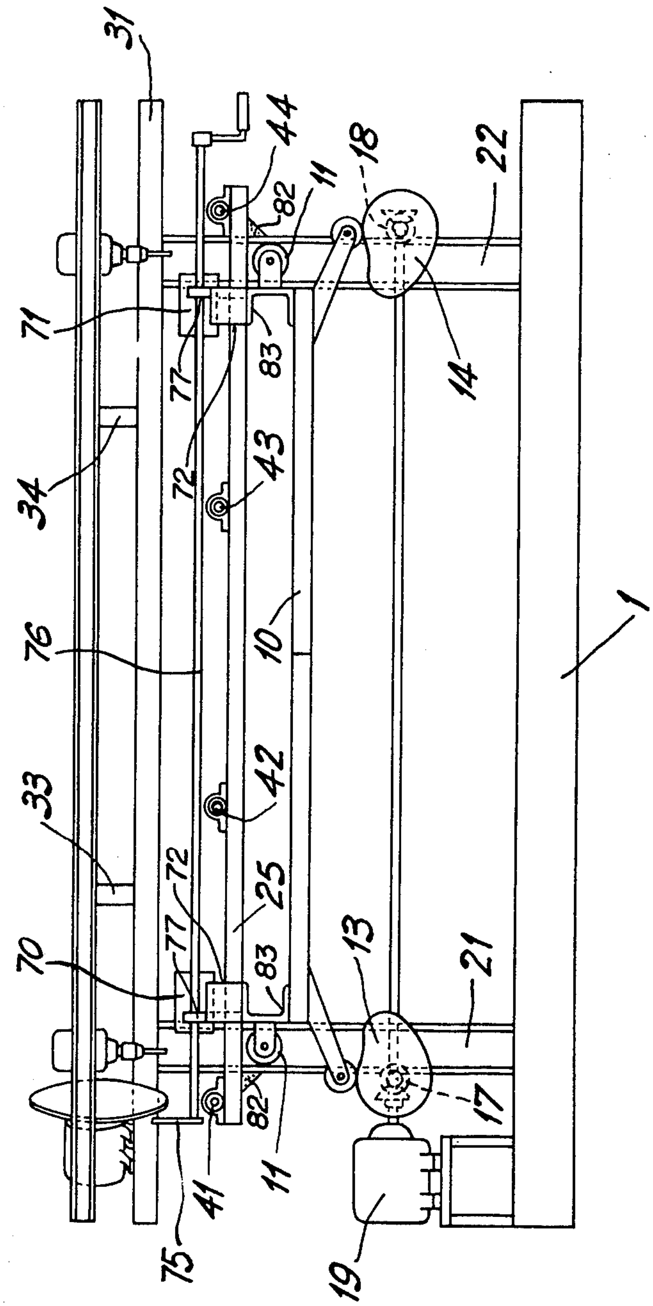
FIG. 2 is a side view of the apparatus of FIG. 1.
Figure 3:
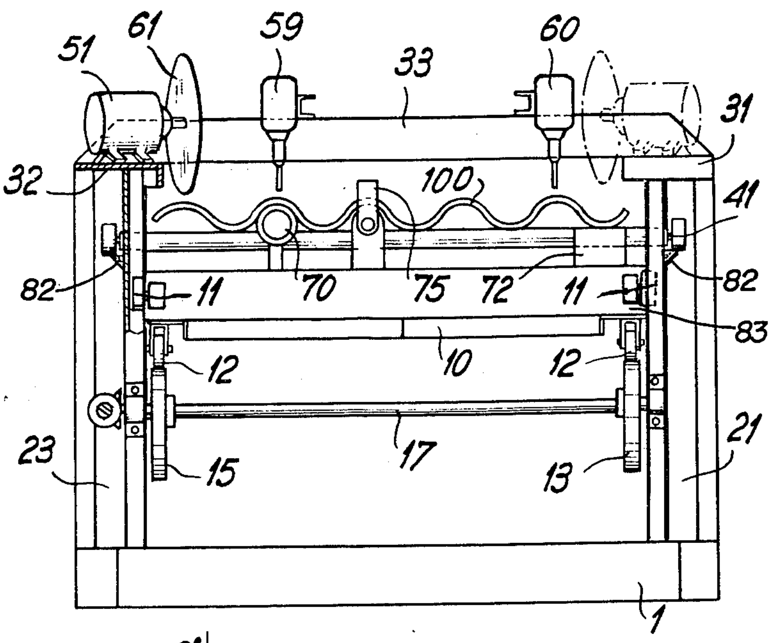
FIG. 3 is an end view of the apparatus generally similar to the apparatus of FIG. 1.

Referring to FIGS. 1 to 3, the machine is constructed of a framework 1 which rests on the ground. Standing on this framework, there extend perpendicular to the ground four columns 21, 22, 23 and 24 which support a frame constituted by two longitudinal beams 31 and 32 connected together by cross-members 33 and 34. This frame is designed for carrying the different tools which, in this particular way of putting the invention into effect, remain fixed (saws) or can be displaced translationally in a horizontal plane (drills).

Below the frame there is a frame bearing four transverse rollers 41, 42, 43 and 44 between side members 25 and 26, which side members can optionally slide up and down in columns 21, 22, 23 and 24, and can rest with members 25 and 26 resting on stops 82 on columns 21 and 24. The columns 21, 22, 23 and 24 are each comprised of two spaced apart members. Below the frame bearing the rollers, in the low position as shown on FIGS. 1, 2 and 3, there is located a vertical movable table, cross-piece or framework 10. The table 10, as shown in FIG. 1, is composed of a singular cross-piece and, as shown in FIGS. 2 and 3, is composed of two crossed arms. The ascending or descending movement of the table is guided for example by rollers 11 which cooperate with the U-section stanchions constituting columns 21 to 24 and which form a guideway for the rollers 11. The rollers 11 are borne laterally on two beams 83 which also carry at their upper part the elements 70, 71, 72 and 77. The table 10 is supported by rollers 12 on four cams 13, 14, 15 and 16 mounted two by two on axles 17 and 18, the two axles 17 and 18 being driven by a motor 19. The two members 70 and 71 carried by table 10 serve for laterally centreing the sheets. The upper surface of these centreing members which can be constituted for example by a sleeve, is substantially the inverse shape of that of an interior corrugation of the sheet. The two support pieces or bearers 72 also carried by table 10 permit a sheet to rest on the table via the crest of a wave. As table 10 rises, it can pick up the frame of members 25 and 26 and rollers 41 to 44 from the rest stops. The vertical displacement of the table 10 is controlled by the rotation of the cams 13, 14, 15 and 16 so that the support pieces 70, 71, 72, 73 can pass between the rollers 41, 42, 43 and 44 to elevate the corrugated sheets towards the tools and after operation to slide them down to the level of the rollers and so leaving the sheets on the rollers.

At the ends of beams 31 and 32 and substantially at an angle thereto there are placed four electric motors 51, 52, 53 and 54 inclined relative to the longitudinal and transverse directions by an angle appropriately determined for effecting cutting off of the corners. The said motors carry on their axles diamond cutting wheels 61 allowing the sheets to be cut off in the desired corners.

The cross members 33 and 34 carry on their upper surface two slide-ways 55 and 56 in the interior of which there can slide four electric motors with vertical axes 57, 58, 59 and 60 which motors can receive twist drills. The arrangement of the tools employed appears better on FIG. 4.

Attached to table 10 for rotation in two brackets 77 is a rod or axle 76 which carries at each end a crossbar or stop 75, generally affixed at a right angle to the rod 76.

Figure 4:
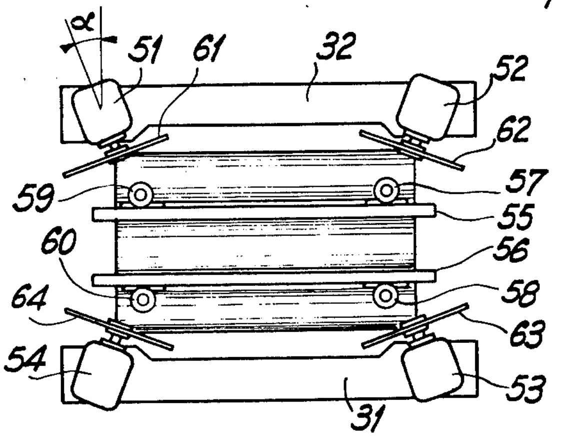
FIG. 4 is a schematic view from above showing the general organisation of the apparatus generally similar to the apparatus of FIG. 1.

The position of the various tools denoted relative to the preceding figures is schematically shown on FIG. 4 the angle $\alpha$ between the axes of the motors and the transverse direction of the machine is adjustable in such fashion as to permit different cutting angles. In practice, it is not necessary to cut the four angles simultaneously. In fact two sorts of sheets are distinguished, left-hand sheets and right-hand sheets. In order to make right-hand sheets, only motors 52 and 54 are provided with diamond cutting discs. When in contrast one has to prepare left-hand sheets, the cutters 62 and 64 are demounted are remounted on motors 51 and 53. In contrast, the four motors 51, 52, 53 and 54 stay in position on the beams 31 and 32. On the other hand, the drills within the slots of the guides or slideways 55 and 56 may be positioned to accord with or to correspond to the desired placement of drill holes on the corrugated sheet workpiece. The distance between the axes is controlled by sliding the motors which effect the boring on the guides 55 and 56.

Figure 5:
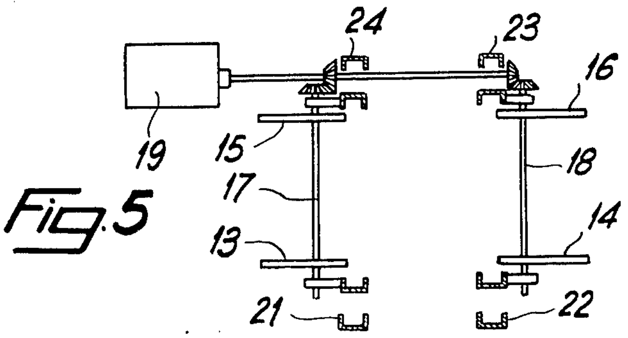
FIG. 5 is a schematic view of the principle of rotation of the cams which serve to raise and lower the table of the apparatus of FIG. 1.

FIG. 5 shows the driving by rotation of cams 13, 14, 15 and 16 which serves to raise or lower the table 10. These cams are supported two by two on axles 17 and 18 which are driven via bevel gears by means of a motor 19. This motor/cam assembly is fixed on the four columns 21, 22, 23 and 24.

There are various solutions for guiding the tools into contact with the sheets which are to be prepared. In the embodiment described, the tools stay fixed in a horizontal plane and the sheets are displaced in the direction of the tools. Advantageously, the movement of raising the sheets being treated on the table is obtained by four cams on which roll rollers fixed to the table at the four corners thereof. The cam system permits, starting with a constant speed of rotation, the following to be obtained:

in a first time period a rapid rise of the table over several centimeters with the object of leading the sheets into contact with the working tools;

in a second time period a slower rise during the working period;

in a third period of time a rapid descent to redeposit the sheets on the rollers.

Figure 6:
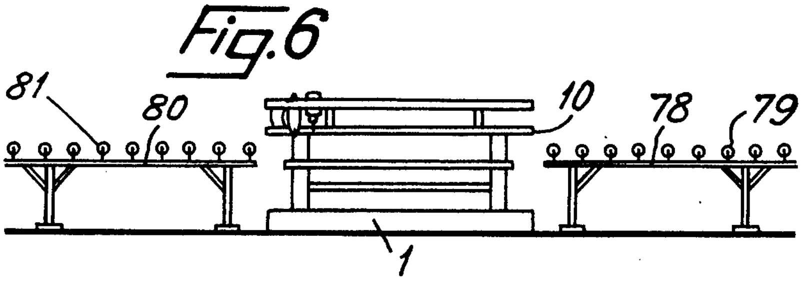
FIG. 6 is a schematic side view of the complete apparatus.
Figure 7:
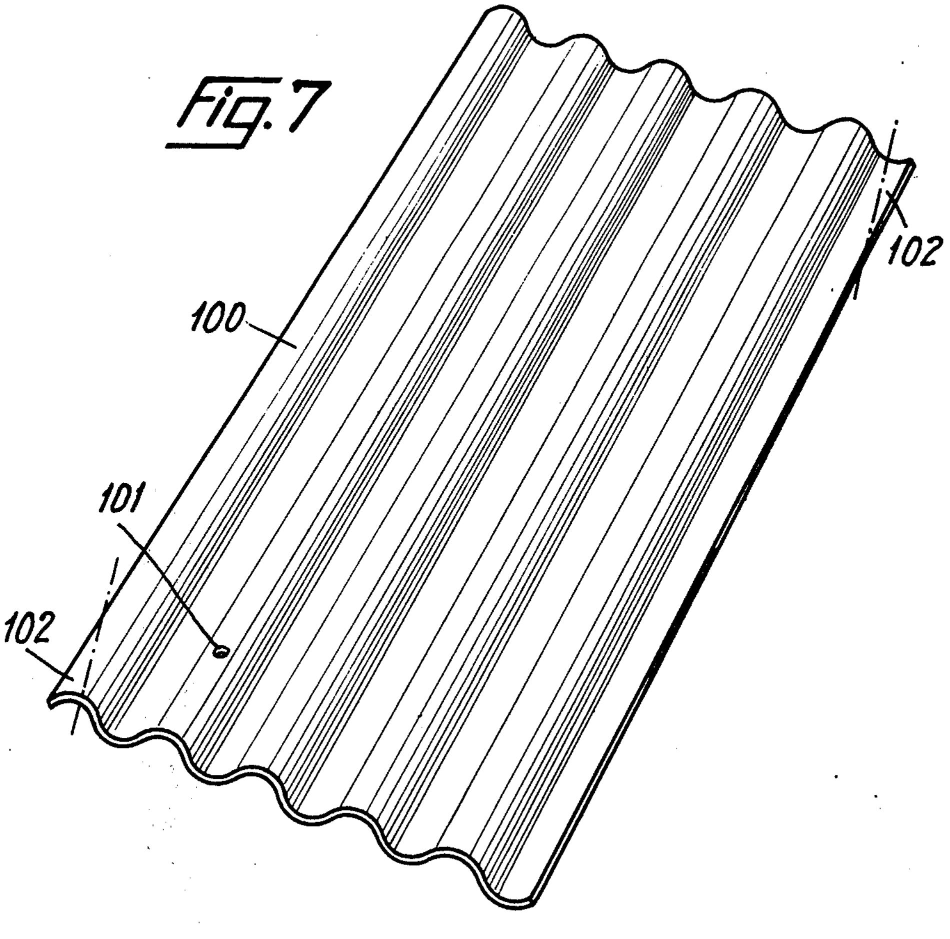
FIG. 7 is a perspective view of a corrugated sheet.
Figure 8:
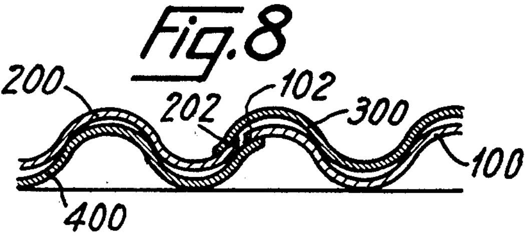
FIG. 8 is a section through an assembly of corrugated sheets at an area where four sheets abut.

FIG. 6 shows schematically a complete machine. It shows the base 1 and the operation table 10. Entry table 78 is provided with rollers 79 for feeding the sheets to be worked on while at the exit of the machine, a table 80 provided with rollers 81 permits the sheets to be extracted.

The functioning of the machine is as follows:

With the table in a low position as shown on FIGS. 1, 2 and 3, an assembly of superimposed sheets, for reasons of practicality a maximum of a dozen sheets, is introduced from the rear of the machine by rolling on the rollers 44 then 43, then 42, then 41, with brackets 77 located below an arch of the corrugated sheet. The advancing movement of the sheets is limited by the stop 75 which is in the vertical position. The sheets are thus positioned longitudinally in the machine. The motor 19 is then started. The axles 17 and 18 first make a rotating movement of rotation which entrains the cams. In the embodiment which is shown in the Figures, the cams turn in the opposite sense two by two. The rollers 12 fixed to the table roll on the cams and generate raising of the table 10. During the initial raising of table 10, the centreing pieces 70 and 71 penetrate to the interior of the second corrugation ensuring thereby correct centreing of the sheets in transverse position. The sheets then rest on members 70 and 71 and on the bearers 72 and are disengaged from rollers 41 to 44. The members 25 and 26 carrying rollers 41 to 44 are then picked up by table 10, and rapid movement raising the sheets continues until the upper sheet on the pile arrives substantially at the level of the lower part of the twist drills and the lower part of the cutting tools, a level common to the assembly of the tools. The rising movement of the table then continues at a lesser speed while, on the one hand the corners placed next the cutting tools are cut off and while the holes which will later serve for the passage of the screw bolts or attachments are pierced. The rotary movement of the cams then continues but the shape of these means that the table 10 redescends. This table is guided in its ascending and descending movement by the rollers 11 which cooperate with the channels formed in the vertical columns 21 to 24. The table 10 continues its descending movement until the assembly of members 25 and 26 and rollers 41 to 44 comes to rest on its stops and the lowermost sheet is then deposited on the rollers 41 to 44. The vertical stop 75 is then swung out of the way by rotating the rod 76 and the prepared sheets can then be removed from the machine by advancing them to the left as seen in FIG. 6 on to exit table 80. The sheets are then ready for putting into position.

Although in the embodiment which has just been described, the sheets are displaced in the direction of the tools, it is evident that it is also possible to keep the sheets in a fixed vertical position with the assembly of the tools descending towards the said sheets to work on them. The apparatus which has just been described can very easily be automated, for example by providing the stop 75 with a switch which causes motor 19 to operate, one of the cams likewise being able to carry a contactor which starts the rotation of the motors for the cutting tools and for perforation when the table starts its slow elevation movement during the course of which the working is effected. A second contactor joined to the same cam or to one of the other cams can interrupt the rotation of the working motors when the descending movement of the table starts.

In the same way, the cams which have been described which serve for ascending and descending movement of the table can be replaced by screw jacks or hydraulic jacks. Again the table can rise up to the height of the cutting and perforating tools these then descending to work on the sheets.

It will be apparent that modifications can be effected to the embodiment which has just been described notably by the substitution of equivalent technical means without for that reason departing from the scope of the present invention.

In addition the present invention is in no way limited to the preparation of asbestos cement corrugated sheets.

I claim:

1. Apparatus for preparing corrugated sheets, which comprises a first rectangular framework having a pair of spaced apart vertical columns disposed at each of the four corners of said framework, each pair of columns forming a guideway and bearing a horizontal structure having affixed thereto a plurality of cutting and drilling tools which are adjustable in position; a second framework disposed in the guideway for supporting one or more corrugated sheets, said second framework comprising a pair of side members extending parallel to each other, each side member passing through each of the guideways formed by two adjacent pairs of columns, said side members also having a plurality of rollers rotatably mounted upon and extending perpendicular to both said side memebers; a horizonatally positioned table disposed below said second framework and having its corners mounted at said vertical columns; means for aligning one or more corrugated sheets fed into the apparatus in a position to engage said tools, said means being attached to the upper surface of said table and mounted in spaced relationship from said second framework; and displacement means attached to said first framework to vertically displace said table and said horizontal structure towards and away from each other to form prepared corrugated sheets.

2. Apparatus according to claim 1 wherein said table is mounted at the vertical columns by means of a roller fixed to each corner of said table, said rollers being vertically translatable in a vertically longitudinal groove located at the surface of one column of each corner pair of columns; said tool bearing horizontal structure being immovably fixed at the top of said vertical columns; and said displacement means being capable of vertically displacing said table.

3. Apparatus according to claim 1, wherein said vertical displacement means comprises a second roller mounted on each corner of said table, said second roller engaging a cam which cam is mounted for rotation on each of said columns, said cams being connected for simultaneous rotation by means of a series of drive rods which rods connect each cam to a drive motor, the configuration of said cams being such as to allow a cycle of vertical translation of said table including a first rapid rise, then a slow rise and then a fast descent.

4. Apparatus according to claim 1 which further comprises means to fixedly secure said second framework to said vertical columns.

5. Apparatus according to claim 1 wherein said means for aligning said corrugated sheet comprises two first longitudinally aligned members projecting vertically upward from the surface of said table, the upper surface of said members being substantially of a complementary shape to that of an internal corrugation of a workpiece and two second longitudinally aligned members projecting vertically upward from the upper surface of said table, the center of said second members being placed at an odd number of half wave lengths of corrugation from said first longitudinally aligned members.

6. Apparatus according to claim 1, wherein the cutting tools for cutting corrugated sheets are comprised of diamond edged cutting wheels mounted on motors with horizontal axles, said motors being rotatable around vertical mounting axes to enable the angle at which the corners of the corrugated sheets are cut off to be adjusted, and said drilling tools for perforating corrugated sheets have vertical axes and are mounted slidably on two longitudinally extending guides so that their position may be adjusted.

* * * * *